US006913380B2

(12) United States Patent
Boffard et al.

(10) Patent No.: US 6,913,380 B2
(45) Date of Patent: Jul. 5, 2005

(54) CONTINUOUS PREPARATION OF HEAT-VULCANIZABLE SILICONE COMPOSITIONS

(75) Inventors: Jodi Boffard, Clifton Park, NY (US); Navjot Singh, Rye, NY (US); Alan L. Tate, Buskirk, NY (US); Robert Dean, Rexford, NY (US); Devesh Mathur, Clifton Park, NY (US)

(73) Assignee: General Electric Company, Pittsfield, MA (US)

( * ) Notice: Subject to any disclaimer, the term of this patent is extended or adjusted under 35 U.S.C. 154(b) by 401 days.

(21) Appl. No.: 10/107,188

(22) Filed: Mar. 28, 2002

(65) Prior Publication Data

US 2002/0136085 A1 Sep. 26, 2002

Related U.S. Application Data

(62) Division of application No. 09/468,758, filed on Dec. 21, 1999, now Pat. No. 6,414,054.

(51) Int. Cl.[7] .............................................. B28B 7/48
(52) U.S. Cl. ............................ 366/77; 366/85; 366/88; 366/186; 366/321; 366/327.4
(58) Field of Search ..................... 366/85, 186, 301, 366/327.1–327.4, 88, 77, 321; 241/98, 152.2, 163, 186.5; 425/202, 204, 205, 209

(56) References Cited

U.S. PATENT DOCUMENTS

| 35,287 | A | * | 5/1862 | Alvord ....................... 425/182 |
| 742,227 | A | * | 10/1903 | Peck ........................ 241/186.4 |
| 2,968,836 | A | * | 1/1961 | Colombo ..................... 366/75 |
| 3,216,706 | A | * | 11/1965 | Loomans ..................... 366/85 |
| 3,266,738 | A | * | 8/1966 | Goeser et al. ................ 241/98 |
| 3,388,196 | A | * | 6/1968 | Farrell ......................... 264/75 |
| 3,647,493 | A | | 3/1972 | Gresch et al. |

(Continued)

FOREIGN PATENT DOCUMENTS

| DE | 19720973 | 11/1998 |
| EP | 0258159 | 3/1988 |
| EP | 0568891 | 10/1993 |
| EP | 570387 | 12/1994 |
| EP | 0812873 | 12/1997 |
| EP | 0841363 | 5/1998 |
| EP | 902057 | 3/1999 |
| EP | 0911359 | 4/1999 |
| FR | 1356678 | 3/1964 |
| FR | 1485408 | 6/1967 |
| GB | 1134167 | 11/1968 |
| WO | WO 9213694 | 8/1992 |
| WO | WO 99/17625 | * 4/1999 |

Primary Examiner—David Sorkin
(74) Attorney, Agent, or Firm—Philip D. Freedman; Kenneth S. Wheelock (57) ABSTRACT

High levels of treated fumed silica, processing fluid and high molecular weight silicone polymer are continuously compounded into a homogeneous silica filled heat-vulcanizable silicone composition by forming a premix in a continuous annular layer mixer and continuously discharging the premix into a compounding apparatus for compounding to form the filled heat-vulcanizable silicone composition.

16 Claims, 4 Drawing Sheets

U.S. PATENT DOCUMENTS

| Patent | | Date | Inventor | Ref |
|---|---|---|---|---|
| 3,824,208 A | | 7/1974 | Link et al. | |
| 3,869,111 A | * | 3/1975 | Matsuoka | 366/77 |
| 3,923,291 A | * | 12/1975 | Matsuoka et al. | 366/77 |
| 3,938,783 A | | 2/1976 | Porter | |
| 4,131,371 A | * | 12/1978 | Tynan | 366/301 |
| 4,528,324 A | | 7/1985 | Chung et al. | |
| 4,737,561 A | | 4/1988 | Stary et al. | |
| 4,739,026 A | | 4/1988 | Riederer et al. | |
| 4,898,898 A | | 2/1990 | Fitzgerald et al. | |
| 5,018,673 A | | 5/1991 | Eirich et al. | |
| 5,153,238 A | | 10/1992 | Bilgrien et al. | |
| 5,198,171 A | | 3/1993 | Kasahara et al. | |
| 5,246,288 A | | 9/1993 | Jetzer et al. | |
| 5,338,112 A | | 8/1994 | Boden et al. | |
| 5,369,149 A | | 11/1994 | Unger | |
| 5,409,978 A | | 4/1995 | Hamada et al. | |
| 5,430,077 A | | 7/1995 | Unger | |
| 5,516,205 A | * | 5/1996 | Oda et al. | 366/75 |
| 5,531,923 A | | 7/1996 | Le Blanc et al. | |
| 5,573,189 A | | 11/1996 | Ward et al. | |
| 5,623,028 A | | 4/1997 | Fitzgerald et al. | |
| 5,679,726 A | | 10/1997 | Gutek et al. | |
| 5,908,592 A | | 6/1999 | Kimura et al. | |
| 5,910,276 A | | 6/1999 | Guntherberg et al. | |
| 5,925,709 A | | 7/1999 | Takahashi et al. | |
| 6,013,701 A | | 1/2000 | Kunimatsu et al. | |
| 6,017,996 A | | 1/2000 | Hamada et al. | |
| 6,124,392 A | | 9/2000 | Heisler et al. | |
| 6,177,506 B1 | | 1/2001 | Takahashi et al. | |
| 6,194,518 B1 | | 2/2001 | Singh et al. | |
| 6,414,054 B1 | * | 7/2002 | Boffard et al. | 523/322 |
| 6,523,988 B1 | * | 2/2003 | Berdais et al. | 366/76.1 |

\* cited by examiner

CONTINUOUS PREPARATION OF HEAT-VULCANIZABLE SILICONE COMPOSITIONS

This application is a division of application Ser. No. 09/468,758, filed Dec. 21, 1999 now U.S. Pat No. 6,414,054.

BACKGROUND OF THE INVENTION

The invention relates to a process for continuously preparing heat-vulcanizable silicone compositions.

A heat-vulcanizable silicone composition comprises a high viscosity silicone polymer, an inorganic reinforcing filler and various additives that aid processing or impart desired final properties to the composition. A vulcanizing agent can be added and the composition heat-cured to fabricate silicone rubber moldings such as gaskets, medical tubing and computer keypads.

Typically, the heat-vulcanizable silicone composition is produced by kneading a high-viscosity polydiorganosiloxane, the inorganic filler and additives by means of a batch kneading machine such as a high intensity Banbury mixer or a low intensity double arm dough mixer. In this process, polydiorganosiloxane, inorganic filler, treating agents and additives are batch mixed until desired properties are obtained. In Kasahara et al., U.S. Pat. No. 5,198,171, a preconcentrate of polydiorganosiloxane, inorganic filler and treating agents is formed by a high speed mechanical shearing mixer. The resulting premix is further compounded in a same-direction double screw extruder. The premix is formed in a first step wherein a diorganopolysiloxane having a viscosity at 25° C. of $1\times10^5$ cP or more, an inorganic filler and a treating agent are mixed in a high speed mechanical shearing machine to provide a flowable particulate mixture in which each ingredient is present in a substantially uniform, finely dispersed state. The flowable particulate mixture is then fed at a constant feed rate into a kneading and extruding machine that has two screws rotating in the same direction.

A batch process requires long mixing times and large amounts of energy. Non-homogeneous shear and extensional stress across a commercial sized batch can result in non-uniform size distribution of filler that results in variations in properties. Batches processed at different times may be characterized by different physical properties. The batch process is labor, energy and capital intensive and produces materials of only marginal consistency.

In Hamada et al., U.S. Pat. No. 5,409,978, a preconcentrate of polydiorganosiloxane, inorganic filler and treating agents is formed at a temperature in the range of about 200° C. to 300° C. in a co-rotating continuous double screw extruder. The preconcentrate is then compounded and heat treated at 150° C. to 300° C. in a counter-rotating, double screw extruder. However, a process that requires two extruders is expensive and requires significant processing area.

However with these processes, throughput is limited. There is a need for a process that provides improved throughput and which can be adapted as a low cost process that can efficiently utilize a single extruder to continuously and consistently produce a full range of both low viscosity and high viscosity silicone elastomers from filler, additive and polymer.

SUMMARY OF THE INVENTION

The invention provides a process that compounds high levels of filler, processing fluid and silicone polymer into homogeneous filled heat-vulcanizable silicone compositions with requisite reinforcing properties and levels of volatiles. The process comprises continuously feeding filler and silicone polymer to a high speed mixing stage to form a free-flowing particulate concentrate. The concentrate is continuously discharged from the mixing stage to a compounding apparatus for further processing.

In another aspect, the invention relates to a process of forming a premix of filler and silicone polymer. In the process, a filler is mixed with a silicone polymer in a continuous annular layer mixer and a filled silicone polymer premix is discharged from the mixer.

In another aspect, the invention relates to a process of compounding a filled heat-vulcanizable silicone composition wherein a filler is mixed with a silicone polymer in a high speed continuous mixer at an element tip speed of between about 3 m/s and about 100 m/s to form a premix. The premix is then discharged to a next processing apparatus.

In another aspect, the invention relates to a continuous annular layer mixer having a sequence of sections comprising at least a first section comprising a forward pitched mixing element, a second section comprising a neutral or forward pitched cutting element and a third section comprising a rearward pitched mixing element.

In yet still another aspect, the invention relates to a compounding apparatus, comprising a first stage continuous annular layer mixer and at least one subsequent stage comprising an extruder connected to the first stage to permit continuous discharge of processed material from the first stage to the second stage.

DETAILED DESCRIPTION OF THE INVENTION

Banbury or dough mixers are known for the batch compounding of fillers with silicone polymers. The compounding operation has two distinct steps; the first step involves the wetting of the filler by the polymer, while the second step involves breaking down of agglomerates and uniform dispersing of filler in polymer. Sufficient dispersion of filler in polymer is important. Any large undispersed agglomerates result in poor mechanical properties since they can act as failure initiating flaws.

In batch or continuous processes, a treating agent can be dispersed along with the silicone polymer either with or before the addition of filler. In these processes, large interfacial forces develop between silicone polymer and free, unreacted silanol groups present in filler. The treating agent must diffuse through the bulk of the high molecular weight silicone polymer and penetrate a rigid silicone polymer/filler interface to reach the filler for treatment. Mixing intensity must be increased to overcome the large interfacial forces and to permit penetration of the treating agent to access the silanol groups. An increase in mixing intensity causes an undesirable increase in material temperature.

According to the invention, a free-flowing particulate concentrate of silicone and filler is continuously formed in a high feed mixing stage. The concentrate is continuously discharged from the mixing stage to a compounding apparatus for further processing. The mixing stage can comprise a continuous annular layer mixer. A continuous annular layer mixer comprises a cylindrical mixing trough wherein material to be mixed is propelled along a helical path along the axis of the trough in the form of a ring contiguous with the cylindrical mixer wall. A typical continuous annular layer mixer is disclosed in Erich et al., U.S. Pat. No. 5,018,673 describing a mixer comprising an essentially horizontally arranged cylindrical housing, which is provided at a first end with a material supply pipe for a continuous supply of material and, at a second end, with a material discharge pipe for a continuous removal of material. The cylindrical housing encloses a mixing apparatus, which is arranged coaxially in the housing. The mixing apparatus is driveable at high speeds. The apparatus comprises mixing tools, which project essentially radially from the apparatus into the vicinity of the housing inner wall. The mixer includes a draw-in zone that is associated with a material supply pipe and a wetting zone that is provided downstream in an axial conveying direction of the draw-in zone. The mixer also includes means provided in the wetting zone for the admission of liquid into a form of a ring of material. The ring is helically conveyed and moved through the mixer on the housing inner wall. The mixer further includes means for the separation of clusters. The means includes a plurality of cutting devices provided in a radial plane relative to the shaft of the mixing apparatus and arranged at equal annular spacings relative to one another around the full circumference of the housing.

In an embodiment of the invention, a continuous annular layer mixer is utilized as a premixing stage to create a fine dispersion of an uncured silicone polymer in a volume of filler. This material can then undergo a phase transformation under compressive, elongational and shear flow fields in an extruder to a compounded state, where dry filler is in a minority phase. First stage densification of the filler results in shorter incorporation times in the extruder and consequently significant improvement in productivity.

The inorganic filler that can be used in the invention can be any inorganic filler used in blends with silicone polymers. Examples of inorganic fillers include a reinforcing silica such as fumed silica or precipitated silica or a silica that has been surface-treated with an organosilicon compound such as an organopolysiloxane, organoalkoxysilane, organochlorosilane or a hexaorganodisilazane. The filler can be diatomaceous earth, finely crushed quartz, aluminum oxide, titanium oxide, iron oxide, cerium oxide, cerium hydroxide, magnesium oxide, zinc oxide, calcium carbonate, zirconium silicate, carbon black or ultramarine. A single filler or a combination of fillers can be used to reinforce the silicone polymer.

The amount of the filler can be in the range of from about 5 to about 200 parts by weight, desirably from about 10 to about 100 parts by weight and preferably from about 20 to about 60 parts by weight, per 100 parts by weight of silicone polymer.

Residual silanol groups on the surface of a filler can govern strength of hydrogen bonds between the silica and hydroxyl or oxygen groups in the silicone polymer chain. High concentrations of residual silanols in a filler cause "structuring" or "crepe hardening" of the final product in storage. This effect leads to difficulties in the processing of the material after it has been stored for extended periods. If the concentration of silanol functional groups in a filler is too high, a treating agent can be added to reduce the groups to a required concentration. The silanol reactant treating agent can react to reduce available groups to a concentration of between about 8 to about 2 hydroxyl groups/(nanometer)$^2$ of filler, preferably between about 7 to about 3 hydroxyl groups/(nanometer)$^2$ of filler. The surface-treated silica is a preferred filler in the invention, in an amount from about 10 to about 100 parts by weight, preferably from about 20 to about 60 parts by weight, per 100 parts by weight of silicone polymer.

The treating agent can be mixed into the filler to reduce filler silanol groups, to improve dispensability of the filler and/or to reduce the time required for aging of the silicone rubber, to prevent crepe hardening and/or to regulate plasticity. The treating agent can be an organosilane, a low-viscosity polysiloxane or a silicone resin, which has a silanol group and/or an alkoxy group having 1 to 6 carbon atoms. Examples include diphenylsilanediol, dimethylsilanediol, methyltriethoxysilane and phenyltrimethoxysilane. The low-viscosity polysiloxane may contain one or more kinds of organic groups selected from a methyl group, a phenyl group, a vinyl group and a 3,3,3-trifluoropropyl group. The viscosity of the polysiloxane measured at 25° C. is in the range of from about 1 to about 300 cP, preferably from about 5 to about 100 cP. The treating agent can be added in an amount of from 0.1 to 100 parts by weight, desirably from 0.5 to about 50 parts by weight and preferably from about 1.0 to about 20 parts by weight per 100 parts by weight of the filler. Preferred silanol-reactant treating agents include silanol-stopped polydimethylsiloxane, octamethylcyclotetrasiloxane (D4) and hexamethyldisilazane (HMDZ).

The silicone polymer used in the compositions of the present invention can be represented by recurring units of Formula I:

Formula I wherein, $R^1$ independently at each occurrence represents $C_{1-4}$ alkyl, or $C_{2-4}$ alkylene; $R^2$ independently at each occurrence represents $C_{1-4}$ alkyl, $C_1$-$C_4$ haloalkyl or $C_{2-4}$ alkylene; $R^3$ independently at each occurrence represents H, $C_{1-10}$ alkyl, $C_{2-4}$ alkylene, $C_{4-6}$ cycloalkyl, OH or $C_1$-$C_4$ haloalkyl; and n represents an integer from 1,000 to 20,000.

A further preferred composition comprises a silicone polymer wherein, $R^1$ independently at each occurrence represents, $CH_3$ or $CH=CH_2$; $R^2$ independently at each occurrence represents, $CH_3$, $CH=CH_2$ or $CH_2CH_2CF_3$; $R^3$ independently at each occurrence represents $CH_3$, $CH=CH_2$, OH or $CH_2CH_2CF_3$; and n represents an integer from about 4,000 to about 10,000.

Another embodiment provides a composition wherein the vinyl content of the silicone polymer ranges from about 0.05% to about 0.5% by weight of the silicone polymer.

The heat-vulcanizable silicone composition can also include other additives such as heat-resistance improvers such as oxides, hydroxides and fatty acid salts of metals, vulcanization reverse inhibitors, flame retardants such as platinum compounds, discoloration preventive agents, plasticizers such as silicone oil, internal release agent such as metal soaps, pigments and dyes.

Features of the invention will become apparent from the following drawings and detailed discussion, which by way of example without limitation describe embodiments of the present invention.

Figure 1:
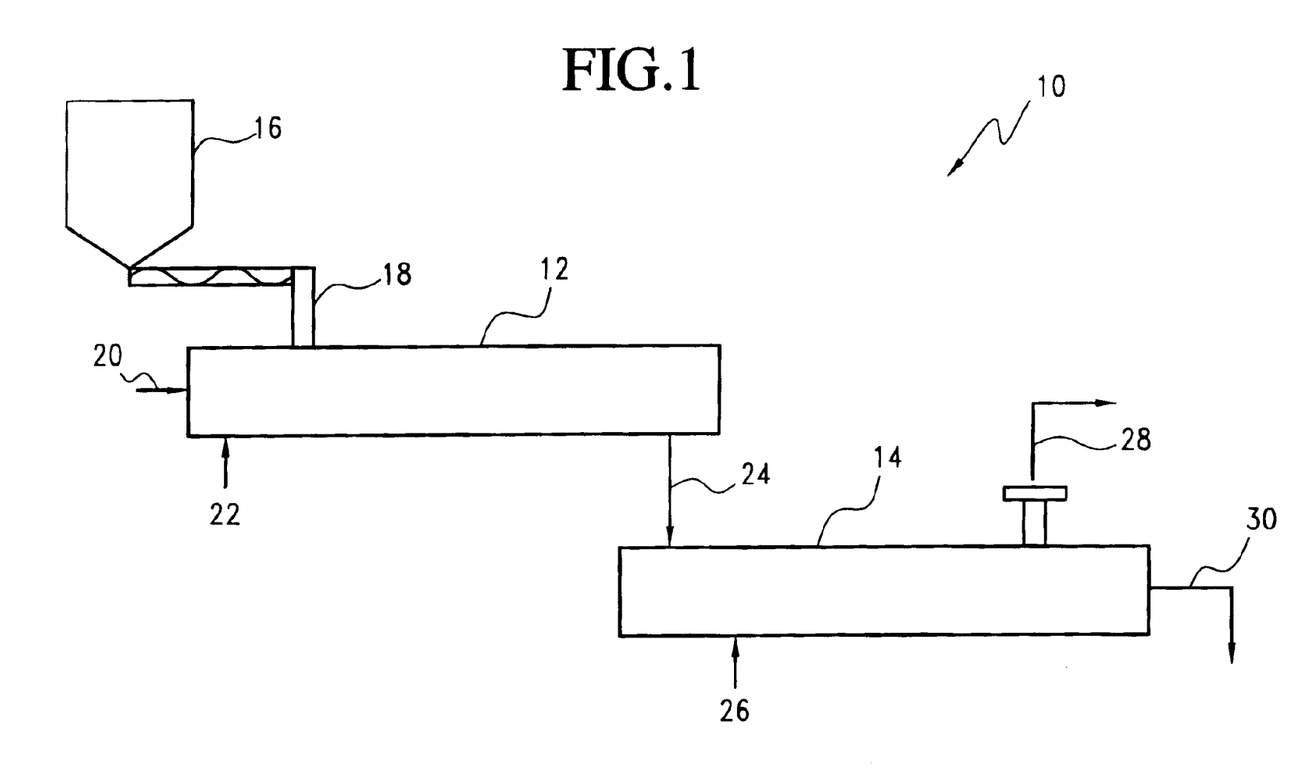
FIG. 1 is a schematic representation of a continuous heat-vulcanizable silicone composition compounding process and apparatus.

FIG. 1 schematically represents a process according to the present invention

In FIG. 1, the apparatus 10 of the invention includes a high speed mixing stage 12 and an extruder stage 14. High speed mixing stage 12 can represent a continuous annular layer mixer and can represent a single mixer or a plurality of mixers arranged to operate in sequence. The extruder stage 14 can be one or more of a co-rotating intermeshing double screw extruder, a counter-rotating double screw extruder or a single screw extruder. Preferably, the extruder stage 14 is a co-rotating intermeshing double screw extruder or a single reciprocating screw extruder. When the extruder stage includes a plurality of extruders, they can be connected sequentially or in tandem.

In the process of the invention, filler is contained in loss-in-weight feeder 16 and is fed 18 along with silicone polymer 20 and treating agent 22, into mixing stage 12.

In the mixing stage 12, the polymer, filler and agent are subjected to a high speed, high intensity force to produce a free flowing powder premix 24. Adequate tip speed and residence time are required to break down the material and to coat the filler with polymer and wet the materials with treating agent. The materials can be mixed at an element tip speed of between about 3 m/s and about 100 m/s to form the premix. Desirably, the element tip speed is between about 10 m/s and about 80 m/s and preferably between about 15 m/s and about 60 m/s. Residence is the time required for material to pass through the mixer. Residence time can be between about 3 seconds (s) to about 5 minutes (min) when a single mixer is used. The residence time for a single mixer can be from about 5 s to about 1 min and preferably can be between about 20 s to about 45 s. The mixing stage 12 can comprise a plurality of mixers. When two mixers are used in sequence, residence time for the two can be from about 5 s to about 10 min or the residence time can be from about 10 s to about 5 min or preferably 20 s to about 3 min. The mixing stage 12 can produce a product with a tap density of about 0.3 to about 0.6 or about 0.35 to about 0.55 or even 0.36 to about 0.48.

Advantageously, the premix 24 can be used in a continuous process (as illustrated herein) or can be stored for example by being discharge to a storage area and distributed for later use. In FIG. 1, the premix 24 is fed to extruder stage 14 where it is compounded with additives 26 and devolitilized to produce a heat-vulcanizable silicone polymer composition 30. Annular mixer 12 is connected in sequence with compounding extruder 14 and can be adjacent and connect to extruder 14 or can abut and be connected to the extruder 14 and the composition can be devolatilized 28 in extruder 14.

Figure 2:
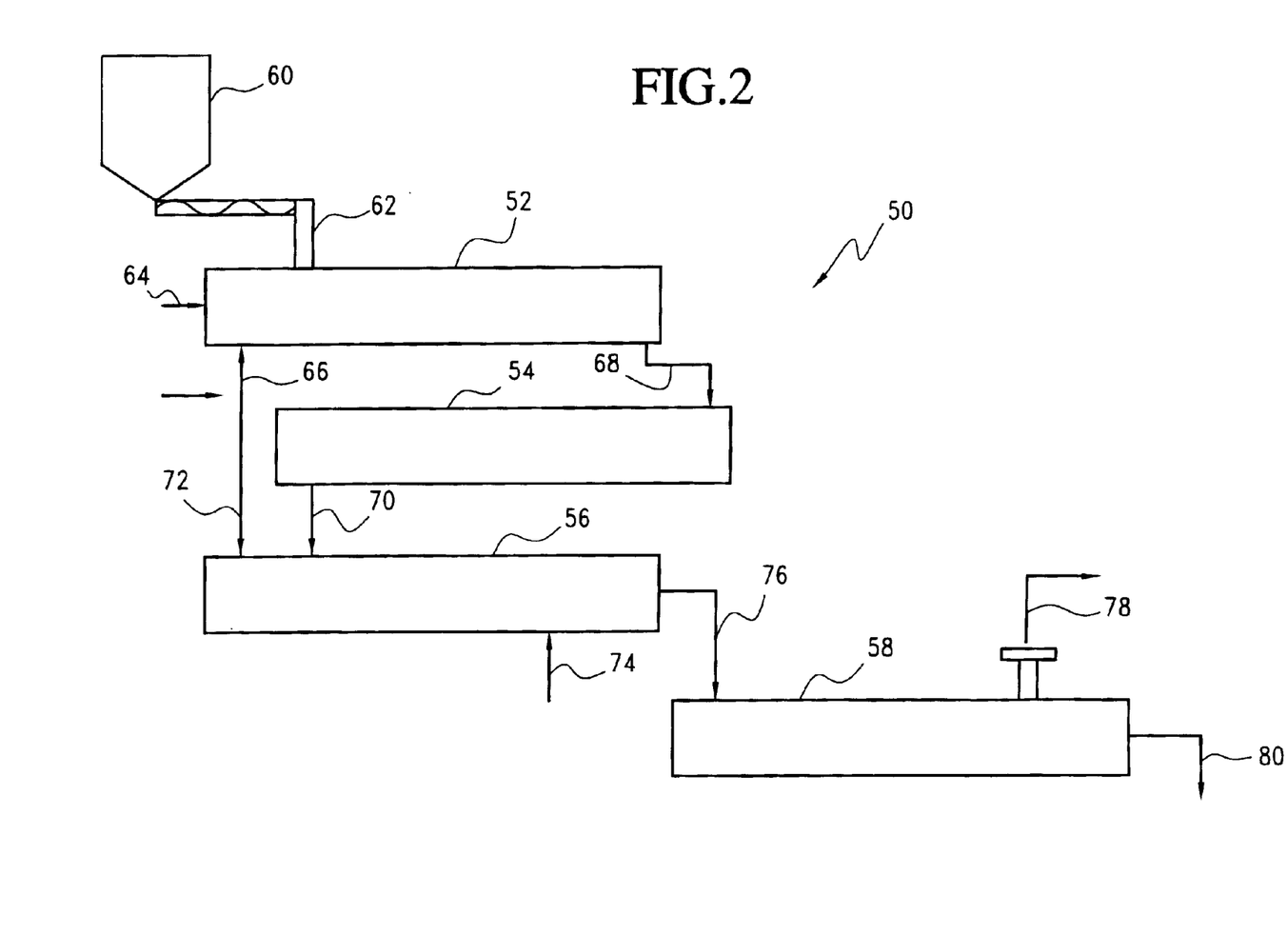
FIG. 2 is a schematic representation of a continuous heat-vulcanizable silicone composition compounding process and apparatus.

FIG. 2 illustrates another embodiment of the invention. The apparatus 50 of FIG. 2 includes continuous annular layer high speed mixer 52 and a second mixer 54 arranged in sequence. Two or more mixers can be utilized to provide increased residence time to provide a more consistent premix. The FIG. 2 apparatus includes extruder 56 connected in sequence down stream of mixers 52, 54 and subsequent extruder 58.

In the process illustrated in FIG. 2, loss-in-weight feeder 60 meters filler 62 into first mixer 52 to be mixed with polymer 64 and treating agent 66. The product from mixer 52 is charged 68 into mixer 54 where a free flowing powder premix 70 is produced, which is charged to extruder 56 where additional treating agent is added 72 for further filler treatment. Additional polymer can be added (not shown) in this step to make low durometer material. Processing aids and other additives are added 74 in this step to produce a product 76 which is charged into extruder 58 for devolitilization 78. Extruder 58 produces a heat vulcanization silicone polymer composition 80 for further use. Extruder 58 can be an helically driven extruder mechanism.

FIGS. 3 to 8 show a continuous annular layer mixer and associated elements.

Figure 3:
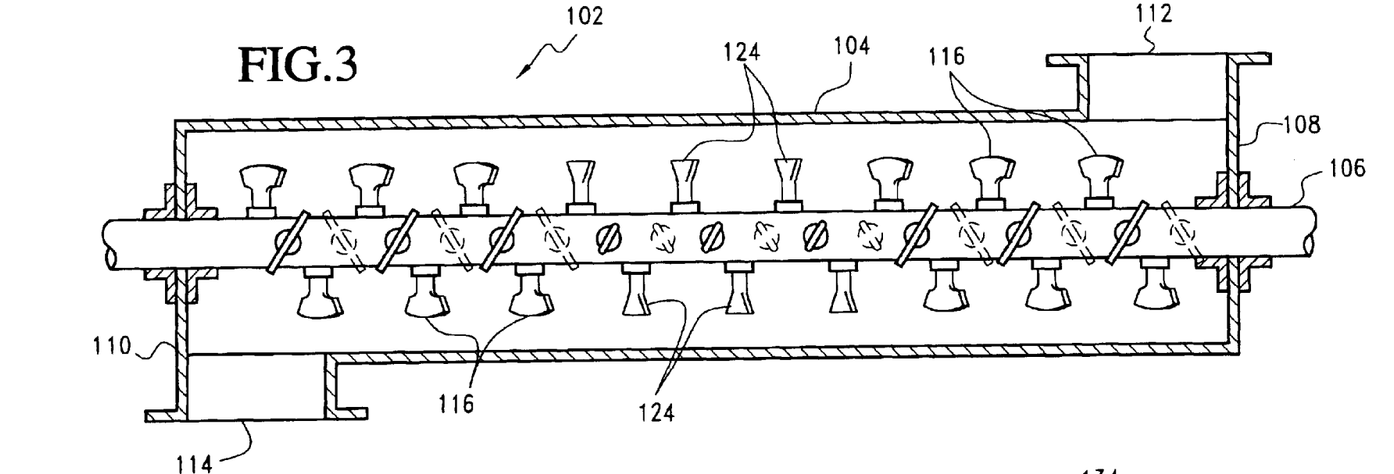
FIG. 3 is a side elevation view of a continuous annular layer mixer.
Figure 4:
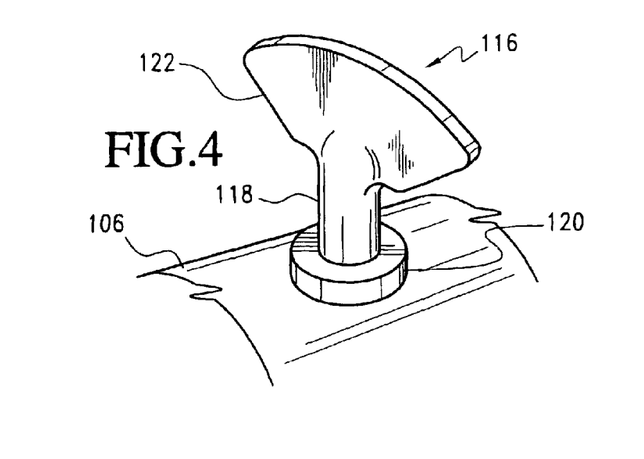
FIGS. 4 and 5 are perspective views of mixer elements.
Figure 5:
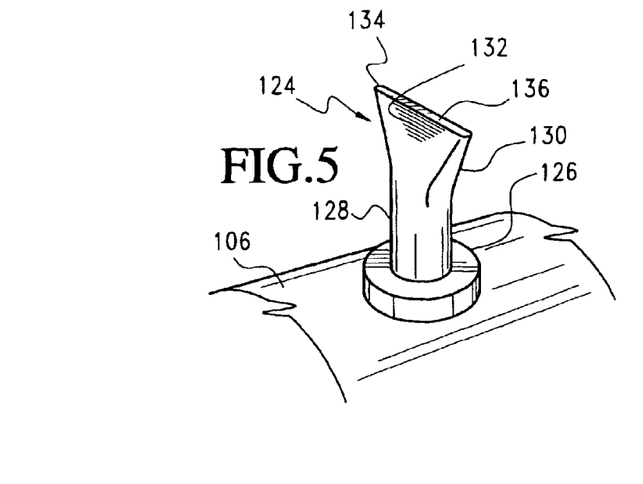

FIGS. 4 and 5 are representations of processing elements that can be included in a mixer that can be used in the invention. FIG. 3 is a side elevational view of a continuous annular layer mixer 102 showing a placement of the elements of FIGS. 4 and 5.

In FIG. 3, mixer 102 comprises a cylindrical housing 104 with central longitudinal shaft 106. The housing 104 is sealed at transverse ends by end walls 108, 110. The shaft 106 projects through both ends of the housing 104 and is sealed by end walls 108, 110. Material feed 112 is attached to an upper part of housing 104 to open substantially tangentially into the interior of the housing 104 and discharge 114 is provided at a lower end of the housing 104 substantially tangentially to the interior of the housing 104 and opening out from the interior of the housing 104.

Figures 7, 8, 9:
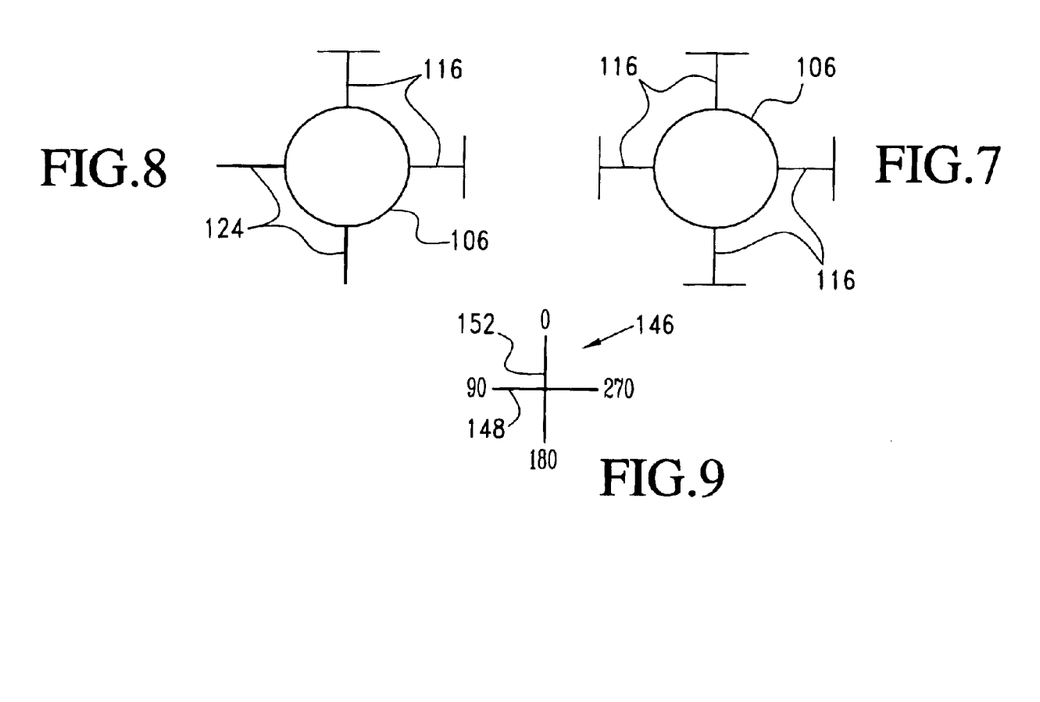
FIG. 7 is a schematic representation of a view along the shaft longitudinal axis of a continuous annular layer mixer.
FIG. 8 is a schematic representation of another view along the shaft longitudinal axis of a continuous annular layer mixer.
FIG. 9 is a reference compass for determining element pitch.

Processing elements of various designs are provided on shaft 106 of mixer 102. FIG. 4 shows a mixing element 116 that extends from rotatable shaft 106 and projects radially from shaft 106 within the continuous annular layer mixer 102 of FIG. 3. Mixing elements 116 are axially aligned at 90° intervals as viewed along the shaft 106 longitudinal axis and as shown in FIGS. 7 and 8. Mixing element 116 includes stem 118 extending from base 120 to terminate in distal fan-shaped head 122. The mixing element 116 is shown extending perpendicular to the base 120 with an angled paddle head 122. The element 116 is fixed in the base 120 at a head pitch angle to provide a relatively increased conveying (propulsive) function or backmixing function, as the case may be. Various pitches of elements and descriptions of function are provided hereinafter with reference to FIGS. 6 to 9.

FIG. 5 shows cutting element 124 extending from base 126 and directed radially from the shaft 106 within the mixer 102. The cutting element 124 includes stem 128 that flares outwardly 130 and bevels inwardly 132 to form a cutting edge 134 at its distal head 136. The element 124 is shown extending perpendicular. The element 124 can be fixed at a cutting edge pitch angle so as to control conveying and backmixing functions, as described with reference to FIG. 6 and FIG. 9. The elements 124 are axially aligned at 90° intervals as viewed along the shaft 106 longitudinal axis and as shown in FIG. 8. FIG. 8 is a schematic representation of a view along the shaft longitudinal axis 106 of a continuous annular layer mixer, showing mixing elements 118 and cutting elements 124 projecting from shaft 106.

Figure 6:
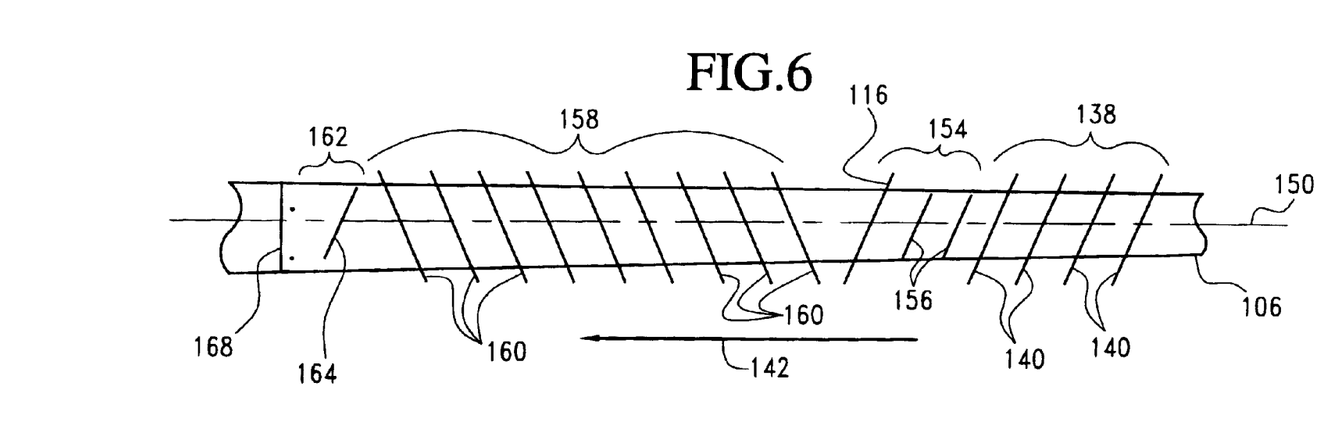
FIG. 6 is a schematic representation of elements illustrating element pitch.

FIG. 6 is a schematic representation of elements illustrating element pitch with respect to the mixer shaft 106. FIG. 6 shows a first draw-in section (first section) 138 of mixer 106, wherein mixing elements 140 are provided that are set with heads in an axial conveying direction 142. Filler/treating agent/silicone polymer material is charged into the mixer 106 via the feed 112 shown in FIG. 3 at first section 138 and is accelerated and set in motion in an axial conveying direction 142 by the mixing elements 140. The FIG. 6 illustrates pitch of element heads 122 and 136 from an axis defined by the longitudinal axis 150 of the mixer shaft 106 where degree of pitch is defined according to FIG. 9 showing a compass 146 with abscissa 148 and ordinate 152. Elements pitched at an angle between 90° and less than 180° impart a conveying function, while elements pitched at an angle between 0° and less than 90° impart a holding function. The mixing elements 140 extend close to the inner wall of housing 104 to avoid dead space and, as illustrated with reference to FIG. 7 elements 116, the mixing elements 140 are spaced around the circumference of shaft 106 at about 90° intervals.

The mixing elements 140 are set into a conveying direction at an angle of about 138° from a perpendicular defined by the compass 146 of FIG. 9, wherein abscissa 148 coincides with mixer shaft longitudinal axis 150 and ordinate 152 is perpendicular to the axis 150. Rotation of conveying element 140 creates a centrifugal force which flings material into the form of a ring at a radial outer end of element 140. Element 140 pitch then causes the charged material in the form of the ring to advance helically through the mixer 102 interior.

A second section 154 of the mixer 102 includes cutting elements 156 that are pitched at a conveying direction angle of about 118° from perpendicular. The cutting elements 156 are circumferentially spaced at about 90° around shaft 106 as shown along with conveying elements 140. This spacing is illustrated in FIG. 9. The cutting elements 156 extend close to inner wall of the housing 104 to avoid dead space. The elements 156 act to separate clusters of material to accelerate wetting of filler.

A third section 158 comprises rearward pitched conveying elements 160 to provide backmixing and increased residence time.

In an embodiment of the invention, the continuous annular layer mixer 102 has a sequence of at least a first section comprising mixing elements, a second section comprising cutting elements and a third section comprising mixing elements. The sections can include other elements besides the specified mixing or cutting elements. For example, the second section can comprise cutting and mixing elements. The first section can comprise forward pitched elements, the second section can comprise forward and neutral elements and the third section can comprise rearward pitched elements for increased residence time. The total elements of the continuous annular layer mixer 102 can comprise about 5 to about 80% first section elements, about 10 to about 85% second section elements and about 0 to about 75% third section elements; desirably about 10 to about 65% first section elements, about 10 to about 65% second section elements and about 10 to about 75% third section elements; or preferably about 15 to about 55% first section elements, about 10 to about 45% second section elements and about 20 to about 65% third section elements.

FIG. 6 illustrates an embodiment of the invention, wherein the continuous annular layer mixer 102 has a sequence of a first section 138 comprising forward pitched mixing elements 140, a second section 154 comprising forward pitched cutting elements 156 and a third section 158 comprising rearward pitched mixing elements 160. As shown in FIG. 6, the mixer 102 can terminate in a fourth section 162 comprising a forward pitched cutting element 164 followed by a neutral element 168 for ejecting the premix. The second section 154 can also include a forward pitched mixing element 166.

According to the invention, premixing in the continuous annular layer mixer creates a fine dispersion of an uncured polymer in a volume of filler. This material then undergoes a phase transformation under compressive, elongational and shear flow fields in an extruder to a compounded state where the dry filler is a minority phase. Densification of the filler in the annular layer mixer results in shorter incorporation times and consequently significant improvement in productivity.

These and other features will become apparent from the following detailed discussion, which by way of example without limitation describes preferred embodiments of the present invention. In the Examples, premix quality is characterized by tap density, BET surface area, solution and dry powder particle size. The premix material is examined by scanning electron microscopy, transmission electron microscopy and compression testing.

EXAMPLE 1

A Drais KIT continuous annular layer mixer is provided with the element configuration described in Table 1.

TABLE 1

| Element No./ Description | Angle* | Description |
|---|---|---|
| 1 | 139 | forward conveying and mixing element |
| 2 | 136 | forward conveying and mixing element |
| 3 | 139 | forward conveying and mixing element |
| 4 | 135 | forward conveying and mixing element |
| 5 | 119 | forward conveying and cutting element |
| 6 | 117 | forward conveying and cutting element |
| 7 | 122 | forward conveying and mixing element |
| 8 | 62 | rearward mixing element |
| 9 | 68 | rearward mixing element |
| 10 | 71 | rearward mixing element |
| 11 | 70 | rearward mixing element |
| 12 | 70 | rearward mixing element |
| 13 | 69 | rearward mixing element |
| 14 | 69 | rearward mixing element |
| 15 | 67 | rearward mixing element |
| 16 | 67 | rearward mixing element |
| 17 | 124 | forward conveying and cutting element |
| 18 | 185 | neutral cutting element |

*angle in degrees from perpendicular as defined by the compass 146 of FIG. 9

A silicone gum is charged into the mixer by means of a Doering pump (p=240 psi) at a rate of 40 lbs/hr and pretreated fumed silica is charged by means of a loss in weight Acrisson feeder at a rate of 60 lbs/hr. Both feeds are at room temperature. The mixer is operated at 3000 rpm at an amperage of 15.5 to 16.5. Discharge temperature increases from 81° F. to 89° F. and shell temperature is consistent at about 73° F. Seven samples are prepared with a tap density of between 0.40 to 0.42.

EXAMPLE 2

The Drais mixing step of Example 1 is repeated with 63 parts of fumed silica and 100 parts of a polymer gum. The product from the Drais mixing step is immediately charged into a Banbury mixer where it is compounded with 2.5 parts methoxy stopped fluid treating agent, 2.5 parts of silanol fluid treating agent/processing aid and 0.8 parts of vinyl methoxy silane crosslinker and then cured with 1.2 parts catalyst for 10 minutes at 350° F. and post baked at 450° F. Physical properties obtained for a 75 Duorometer product are provided in Table 2.

EXAMPLE 3

As a comparison, filler and polymer are added directly to the Banbury mixer and are compounded with the same materials and cured in the same manner as in Example 2. Physical properties obtained for a 75 Duorometer product are provided in Table 2.

TABLE 2

| Property/Example | 2 | 3 |
| --- | --- | --- |
| Shore A Hardness | 72 | 76 |
| Elongation | 395 | 366 |
| 100% Modulus | 322 | 355 |
| Tensile | 1277 | 1302 |
| Tear B | 148 | 153 |
| Specifice Gravity | 1.226 | 1.203 |

EXAMPLE 4

The Drais mixing step of Example 1 is repeated with 63 parts of fumed silica and 100 parts of a polymer gum. The product from the Drais mixing step is immediately charged into a Banbury mixer where it is compounded with 2.5 parts methoxy stopped fluid treating agent, 2.5 parts of silanol fluid treating agent/processing aid and 0.8 parts of vinyl methoxy silane crosslinker. Samples of the materials are compounded in the Banbury mixer at various RPM's. The compounded samples are cured with 1.5 parts of 2,4-dichlorobenzoyl peroxide for 12 minutes at 260° F. The resulting sheet samples are post baked at 200° C. for 4 hours. Physical properties for 75 Duorometer samples are provided in Table 3.

TABLE 3

| Property/Example RPM's | 1400 | 2000 | 2800 | 3200 |
| --- | --- | --- | --- | --- |
| Shore A Hardness | 76 | 77 | 75 | 75 |
| Elongation | 324 | 347 | 308 | 323 |
| 100% Modulus | 410 | 407 | 385 | 366 |
| Tensile | 1327 | 1398 | 1210 | 1220 |
| Tear B | 134 | 126 | 126 | 130 |
| Specifice Gravity | 1.207 | 1.209 | 1.198 | 1199 |

EXAMPLE 5

The Drais mixing step of Example 1 is repeated with 63 parts of fumed silica and 100 parts of a polymer gum. The product from the Drais mixing step is continuously charged into a twin screw, co-rotating intermeshing extruder for compounding and then continuously into a single screw reciprocating extruder for homogenization and stripping. The final product includes 1.35 parts vinyl diol crosslinker, 2.0 parts of silanol fluid treating agent/processing aid and 3 parts of a methylvinyl source as a crosslinker/plasticizer. The product has <1% volatiles. The product is cured with 1.5 parts of 2,4-dichlorobenzoyl peroxide for 17 minutes at 260° F. Product sheets are post baked at 200° C. for 4 hours. Physical properties for 75 Duorometer samples are provided in Table 4.

EXAMPLE 6

The Drais mixing step of Example 1 is repeated with 61 parts of fumed silica and 100 parts of a polymer gum. The product from the Drais mixing step is continuously charged into a twin screw, co-rotating intermeshing extruder for compounding and then continuously into a counter-rotating, non-intermeshing twin screw extruder for homogenization and stripping. The final product includes 1.0 parts of silanol fluid treating agent/processing aid and 0.5 parts of a methylvinyl source as a crosslinker/plasticizer. The product has <1% volatiles. The product is cured with 1.5 parts of 2,4-dichlorobenzoyl peroxide for 17 minutes at 260° F. Product sheets are post baked at 200° C. for 4 hours. Physical properties for 40 Duorometer samples are provided in Table 4.

TABLE 4

| Property/Example | 5 | 6 |
| --- | --- | --- |
| Shore A Hardness | 70.1 | 37.8 |
| Elongation | 327 | 519 |
| 100% Modulus | 420 | 108 |
| Tensile | 1467 | 1078 |
| Tear B | 123 | 69 |
| Specifice Gravity | 1.21 | 1.106 |

The results show that a premix can be continuously prepared in a high speed mixing stage to form a free-flowing particulate concentrate that can be continuously charged to compounding apparatus to prepare heat-vulcanizable silicone compositions While preferred embodiments of the invention have been described, the present invention is capable of variation and modification and therefore should not be limited to the precise details of the Examples. The invention includes changes and alterations that fall within the purview of the following claims.

What is claimed is:

1. A compounding apparatus for preparing heat-vulcanizable silicone compositions, comprising:
    a first stage continuous annular layer mixer comprising a sequence of at least a first section comprising a forward pitched mixing element, a second section comprising a forward pitched cutting element or neutral cutting element and a third section comprising a rearward pitched mixing element; and
    at least one subsequent stage comprising a co-rotating, intermeshing double screw extruder connected to said first stage to permit continuous discharge of processed material from said first stage to the subsequent stage.

2. The compounding apparatus of claim 1, wherein said first stage continuous annular mixer comprises a sequence of at least a first section comprising a mixing element, a second section comprising a cutting element configured differently from the mixing element and a third section comprising a mixing element.

3. The compounding apparatus of claim 2, wherein said first stage continuous annular mixer comprises at least one mixing element that comprises a stem extending to terminate in a distal fan-shaped head and said cutting element comprises a stem that flares outwardly and bevels inwardly to form a cutting edge at its distal head.

4. The compounding apparatus of claim 1, wherein said first stage continuous annular mixer comprises about 5 to about 80% first section elements, about 10 to about 85% second section elements different from the first section elements and about 0 to about 75% third section elements different from the second section elements.

5. The compounding apparatus of claim 1, wherein said first stage continuous annular mixer comprises about 10 to about 65% first section elements, about 10 to about 65% second section elements different from the first section elements and about 10 to about 75% third section elements different from the second section elements.

6. The compounding apparatus of claim 1, wherein said first stage continuous annular mixer comprises about 15 to about 55% first section elements, about 10 to about 45% second section elements and about 20 to about 65% third section elements.

7. The compounding apparatus of claim 1, wherein said first stage continuous annular mixer additionally comprises a final section comprising forward pitched cutting or forward pitched mixing elements.

8. The compounding apparatus of claim 1, wherein said stages are separate, adjacent stages.

9. The compounding apparatus of claim 1, wherein said stages are contiguous abutting stages.

10. The compounding apparatus of claim 1, wherein said first stage comprises a plurality of mixers arrange to operate in sequence.

11. The compounding apparatus of claim 1, wherein said first stage comprises a plurality of mixers, wherein at least two mixers are arrange to operate in tandem.

12. A compounding apparatus for preparing heat-vulcanizable silicone compositions, comprising:

a first stage continuous annular layer mixer comprising a sequence of at least a first section comprising a mixing element, a second section comprising a cutting element configured differently from the mixing element end a third section comprising a mixing element wherein the at least one mixing element comprises a stem extending to terminate in a distal fan-shaped head and said cutting element comprises a stem that flares outwardly and bevels inwardly to form a cutting edge at its distal head; and at least one subsequent stage comprising a co-rotating, intermeshing double screw extruder connected to said first stage to permit continuous discharge of processed material from said first stage to the subsequent stage.

13. The compounding apparatus of claim 12, wherein said first stage continuous annular mixer comprises about 5 to about 80% first section elements, about 10 to about 85% second section elements different from the first section elements and about 0 to about 75% third section elements different from the second section elements.

14. The compounding apparatus of claim 12, wherein said first stage continuous annular mixer comprises about 10 to about 65% first section elements, about 10 to about 65% second section elements different from the first section elements and about 10 to about 75% third section elements different from the second section elements.

15. The compounding apparatus of claim 12, wherein said first stage continuous annular mixer comprises about 15 to about 55% first section elements, about 10 to about 45% second section elements and about 20 to about 65% third section elements.

16. The compounding apparatus of claim 12, wherein said first stage continuous annular mixer additionally comprises a final section comprising forward pitched cutting or forward pitched mixing elements.

* * * * *